May 7, 1935.  A. SCHMALENBACH  2,000,038
APPARATUS FOR THE PRODUCTION OF AMMONIUM SULPHATE
Filed Sept. 10, 1932
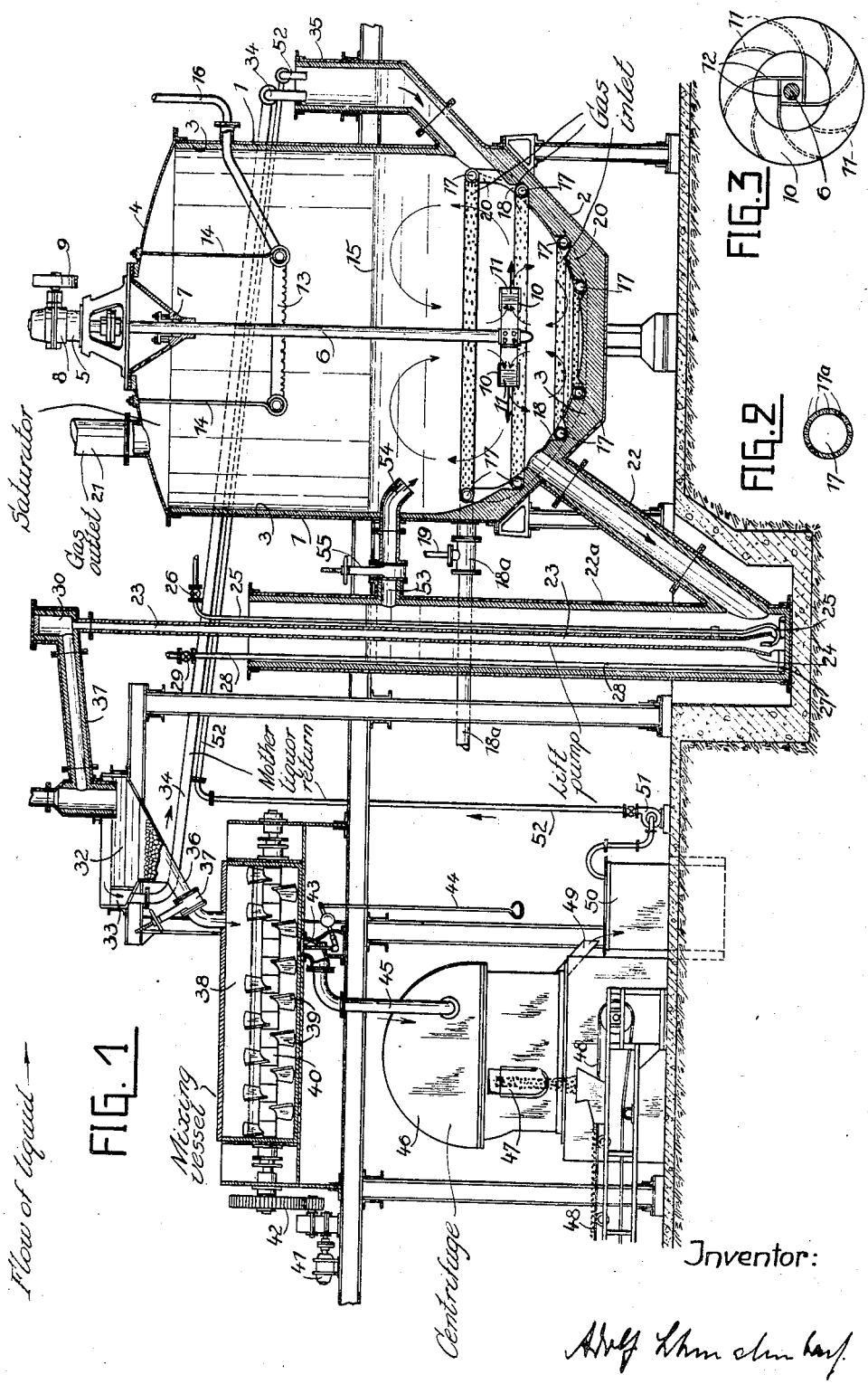
Inventor:
Adolf Schmalenbach Patented May 7, 1935

2,000,038

UNITED STATES PATENT OFFICE 2,000,038

APPARATUS FOR THE PRODUCTION OF AMMONIUM SULPHATE

Adolf Schmalenbach, Essen-Ruhr, Germany

Application September 10, 1932, Serial No. 632,495
In Germany July 30, 1931

8 Claims. (Cl. 23—273)

My invention relates to apparatus which are known as "saturators" and serve to the production of ammonium sulphate from gaseous ammonia and sulphuric acid, and has particularly reference to apparatus of this class which substantially consist of an absorption vessel intended to receive a solution of ammonium sulphate containing free sulphuric acid, and provided with appliances for the production of coarse-crystalline ammonium sulphate and for the withdrawal of the ammonium sulphate crystals formed in the liquid into a device serving to dry the salt.

In my co-pending patent application Serial Number 464,054, "Improvements in saturators", I have described an apparatus for the production of coarse-crystalline ammonium sulphate, in which means are provided in the saturator for causing an agitation and thus homogenization of the liquid in the saturator and a whirling-up of the crystals depositing on the bottom thereof.

One object of my present invention is so to improve the saturator described in my above-named prior patent application that this saturator is well suited also for the treatment of concentrated ammonia gas with sulphuric acid, in order to yield coarse-crystalline ammonium sulphate.

The essential feature of my new saturator consists in the fact that means are provided in connection with the saturator for causing a fine distribution of the concentrated ammonia gas in the saturator liquid. To this end I use either an appliance by which a diluting gas is added to the concentrated ammonia gas before it enters the liquid, or I provide, in lieu of this dilution, a special ammonia distributing device in connection with the saturator by which device the ammonia gas is supplied to the liquid space of the saturator in numerous places situated at different levels or, finally, I may introduce the concentrated ammonia gas into the liquid space of the saturator in the vicinity of or through passages provided in, a suitable quickly revolving agitator, whereby I achieve likewise a satisfactory fine distribution of the ammonia.

The employment of a fine distribution of the ammonia in combination with a good intermingling of the saturator bath during the admission of the NH₃ gas results in the fact that a saturator of this improved design is well adapted for the treatment of gases which contain high percentages of ammonia without a local oversaturation of the saturator liquid occurring. As it has been found, such a local high grade or degree oversaturation of the liquid with ammonium sulphate is harmful because of the fact that in such cases the ammonium sulphate at once precipitates in the form of numerous small crystals, that is, crystallizes spontaneously. With an oversaturation of a lower grade or degree of the saturator liquid such a precipitation practically does not take place, on the contrary, the precipitating ammonium sulphate deposits on the ammonium sulphate crystals already existing in the liquid, whereby large crystals are formed of a size as it is frequently demanded nowadays if ammonium sulphate is used as fertilizer.

Another object of my present invention is to provide improvements in saturators by which the withdrawal of the ammonium sulphate crystals from the saturator is facilitated.

According to my invention a salt lift pump, known per se, is arranged to this end beside the satuartor and is connected with the latter by pipes, the lift pump having such a height that the liquid cylinder therein is substantially higher than the liquid level in the saturator.

As known, the effect of such a salt lift pump, which works like the well-known mammoth pumps, depends on the height of the liquid cylinder, existing in the pump. In the saturators heretofore used and having a lift pump arranged within the saturator, the height of the operative liquid cylinder depends on the level of the liquid in the saturator. Now, in a saturator, the liquid level cannot be increased substantially without causing a considerable loss of pressure of the gas current passing through the saturator. Therefore the lowest possible liquid level in the saturator is aimed at. By the arrangement of the salt lifting pump outside the saturator the liquid cylinder which determines the lifting effect is rendered independent of the level of the liquid in the saturator.

Furthermore, as in the saturator constructed according to my invention the velocity of the salt mass lifted by the lift pump is comparatively high, a special construction of the top portion of the lifting pump is necessary in order to prevent an uneconomically rapid wear of the parts concerned of the pump. To this end according to my invention a collecting vessel is arranged on the upper end of the lifting tube in which vessel the velocity of the salt mass is reduced. The salt mass then is delivered by a lateral pipe issuing from the collecting vessel.

Furthermore, I find it advantageous in a saturator provided according to the invention with an outside salt lifting pump to withdraw as far as possible continuously the salt mass lifted from the saturator. As the customary saturators are formed with a conical bottom and with a lifting tube coming from the lowermost portion of the bottom the mass may also be withdrawn intermittently, since the salt precipitating from the saturator liquid collects on the lowermost place of the bottom, that is round the lifting tube.

Now, in continuously lifting the salt mass from the saturator, as it is preferably carried through with the saturator according to my invention, a salt mass is withdrawn which contains a much higher percentage of mother lye than with the known saturators. This high percentage of mother lye necessitates a special treatment of the salt mass previous to its delivery to the centrifuge in which the mass is dried; this special treatment of the lifted mass being further required because, in addition, the smaller crystals have to be separated from the salt mass and re-fed to the saturator, in order to obtain a coarsest-crystalline possible ammonium sulphate.

To this end according to the invention a separation vessel is allotted to the lifting tube that withdraws the mass from the saturator. In this separator the mother lye together with the greater part of the smaller crystals, which deposit only slowly, is separated from the coarse crystals which deposit quickly, the separator further being provided with means for re-feeding to the saturator the mother lye and the smaller crystals.

The salt mass depositing on the bottom of the separator thus mainly consists only of coarse ammonium sulphate crystals with a comparatively low percentage of mother lye.

Another object of my present invention is to provide means by which the final treatment of a salt mass substantially consisting of coarse crystals in a dry centrifuge, preferably a continuously operating one, is facilitated.

In dry centrifuging a salt mass substantially consisting of coarse crystals and a small percentage of mother lye, I have found that such a salt mass is not so uniform as to its quantity and composition (proportion of the crystals to the mother lye) as it is required for centrifuging the mass in the usual centrifuge, the coarse-crystalline salt mass lifted from the saturator on the contrary flowing not uniformly whereby extraordinarily high stresses of the centrifuge drum and its bearings are caused. In order to overcome these difficulties in drying a salt mass consisting of coarse-crystalline crystals and a little mother lye, my invention provides a mixing vessel in front of the centrifuge, in which vessel the composition of the salt mass is permanently maintained uniform by means of mechanical agitators or other suitable means and from which the salt mass is delivered to the centrifuge through a pipe of small length and comparatively large passage area. By this provision of a mixer in front of the centrifuge I am sure that always a salt mass of uniform composition is supplied to the centrifuge and that noxious stresses of the latter are avoided.

With the above and other incidental objects in view, my invention comprises the arrangements and structures which will now be described with reference to the accompanying drawing which forms part of this specification and in which Figure 1 is a sectional view of my improved apparatus for the production of coarse-crystalline ammonium sulphate, Figure 2 is a horizontal section of a pipe through which the ammonia gas is fed to the apparatus, and Figure 3 is a top view of an agitator used.

Referring to the drawing, 1 denotes a vessel which receives the sulphuric ammonium sulphate solution and is formed with a conical bottom 2 and a liner 3 preferably made of a suitable acid-proof keramic mass. On the cover 4 of vessel 1 is mounted in a vertical bearing 5 a shaft 6 which extends into the vessel 1 through a bore provided in the cover 4 and tightened by means of a stuffing box 7. On the bearing 5 is further mounted a gear 8 comprising a pulley 9 by which shaft 6 is driven from any suitable source of power (not shown). On the lower end of shaft 6 is mounted an agitator which has the shape of a centrifugal wheel and is composed of an upper and lower annular disc 10, 10, see Figures 1 and 3, and curved blades 11 fixed between the latter. The discs 10, 10 are carried by a supporting spider-like piece rigid to shaft 6. When the latter revolves, liquid is sucked between the discs 10, 10 and thrown in outward direction by the blades 11, the liquid thus being agitated as marked by the arrows in Figure 1. The speed of rotation of the agitating wheel has to be adjusted in such a manner that no deposition of salt takes place within the saturator, but on the contrary the salt is permanently in circulation so as to be moved into those zones of the liquid where the ammonia gas is introduced. I attain in this way that the sulphate formed deposits on the ammonium sulphate crystals already existing in the liquid, so that the above-mentioned large crystals are formed.

An annular spray 13 is suspended from arms 14 fixed to the cover 4 above the liquid level 15 and serves to supply the sulphuric acid to vessel 1. The acid is fed to spray 13 by a pipe 16. I attain by the provision of this peculiar acid-distributing device that a uniform degree of concentration of the saturator liquid is maintained.

The ammonia gas to be treated in the saturator is fed through a plurality of perforated annular pipes 17 partly embedded in suitable annular grooves 18 provided in the liner 3. As it will be seen from Figure 2, the bores 17a of the annular pipes 17 through which the ammonia gas passes, are comparatively small, whereby the uniform distribution of the gas on the liquid is much favored. They further prevent entry of the saturated ammonium sulphate solution into the pipes 17 and thus troublesome incrustation of the latter.

In order to further prevent such an incrustation of the pipes 17 in case of standstill of the apparatus a pipe 19 is attached to the main gas pipe 18 that leads to the pipes 17, through which pipe 19 water may be supplied to pipes 17 by which incrustations are dissolved.

Between the individual distributing pipes 17 are provided connecting pipes 20 fitted with suitable regulating valves, so that the gas feed to the pipes 17 can be regulated independently. This is of advantage because by such a regulation of the gas fed any entrance of the saturated ammonium sulphate solution into the pipes is avoided with certainty.

As will be seen from Figure 1, the distributing pipes 17 are arranged at different levels within the liquid zone of vessel 1. Instead of arranging the pipes 17 along the wall of vessel 1, they may be mounted at certain distances apart from the wall, which is of special advantage in saturators of large size.

The gases which have not been absorbed by the saturator liquid escape from vessel 1 through a top pipe 21 provided in the cover 4.

The crystals separated from the ammonium sulphate solution during the operation of the apparatus pass through a drain pipe 22 to a lifting vessel 22a situated beside the container 1. The pipe 22 may be arranged as illustrated or may be connected to the lowermost portion of the bottom of the saturator. As will be seen from the drawing, the lifting vessel 22a is of such a height, that the liquid cylinder therein is notably higher than the liquid in the container 1. The salt mass is withdrawn from the latter by means of a usual lifting tube 23 into the lower bell-shaped end 24 of which opens a nozzle pipe 25 through which steam or compressed air is blown in and which is fitted with a regulating valve 26. In addition, vessel 22a is fitted with a steam spray 27 to which steam is supplied through a pipe 28 by means of a valve 29. In case of breakdown, the temperature prevailing in the lifting tube can be regulated by feeding steam thereto, whereby incrustation of the tube is avoided. It may further be of advantage to provide both on the lifting tube and saturator an outer heat-insulating layer, in order to prevent loss of heat and thus to obtain a higher efficiency of the apparatus.

If air or steam is fed to tube 23, the salt mass existing in vessel 22a is lifted and passes to a collecting vessel 30 provided on the upper end of tube 23. The sectional area of vessel 30 is much greater than that of tube 23, so that a notable reduction of the velocity of the salt mass is obtained in vessel 30. A pipe 31 leads from the latter to a separator 32 on the bottom of which the coarse crystals deposit, whilst the mother lye together with the smaller crystals flows away over an overflow 33 through a pipe 34 to a lateral tubular socket 35 provided on container 1, and thus returns to the latter.

It may be suitable in certain cases to re-feed continuously or intermittently a portion of the liquid existing in the vessel 22a to the container 1, in order to remove part of the small crystals from the liquid contained in vessel 22a. To this end the latter is connected by a pipe 53, containing a valve 55, to the container 1. Preferably pipe 53 has an inclined spout 54 which opens into the container 1.

Finally, pipe 53 may be used to withdraw the liquid from the saturator to the lifting tube. In this case the lower connecting pipe 22 is shut off in any suitable manner.

On the bottom of the separator 32 is provided a drain pipe 36 with a damper 37. If the latter is opened, preferably intermittently, the coarse crystals drop from the bottom of separator 32 into a container 38 in which the mass is kept in motion by means of a shaft 40 on which suitable agitating arms 39 are mounted. Shaft 40 is driven by a motor 41 through the intermediary of a gearing 42.

The salt mass is permanently kept in a uniform composition in the container 38 by the agitator 39, 40. Consequently, if a bottom valve 43 of the container is opened by means of a hand lever 44, a salt mass of uniform composition flows from container 38 through pipe 45 to the customary centrifuge 46 in which the salt is separated practically completely from the mother lye. The dry salt passes on a chute 47 to a belt conveyor 48 and from there to a suitable tank or chamber whilst the lye flows through a pipe 49 to a vessel 50 from which it is delivered back to the container 1 by means of a pump 51 through a pipe 52.

Various changes may be made in the details disclosed in the foregoing specification without departing from the invention and the advantages thereof.

In the claims affixed to this specification no selection of any particular modification of my invention is intended to the exclusion of other modifications thereof, and the right to subsequently make claim to any modification not covered by these claims is expressly reserved.

What I claim and desire to secure by Letters Patent is:—

1. An apparatus for the production of coarse-crystalline ammonium sulphate from concentrated ammonia gas and sulphuric acid comprising a vessel adapted to receive the sulphuric acid to be worked up, means for introducing the gas to be worked up in finely divided state into the liquid in said vessel at different levels, means for agitating the liquid in said vessel during the introduction of the gas, and means for withdrawing the solid products from the liquid.

2. An apparatus for the production of coarse-crystalline ammonium sulphate from concentrated ammonia gas and sulphuric acid comprising a vessel adapted to receive the sulphuric acid to be worked up, an ammonia gas feeding pipe, a plurality of perforated pipes in the liquid space of said vessel at different levels, said pipes communicating with said gas feeding pipe, means for agitating the liquid in said vessel during the introduction of the gas, and means for withdrawing the solid products from the liquid.

3. An apparatus for the production of coarse-crystalline ammonium sulphate from concentrated ammonia gas and sulphuric acid comprising a vessel adapted to receive the sulphuric acid to be worked up, a plurality of annular perforated gas inlet pipes in the liquid space of said vessel, said pipes being arranged in recesses of the walls of said vessel, said recesses being provided at different levels within the liquid, means for agitating the liquid in said vessel during the introduction of the gas from the gas inlet pipes, and means for withdrawing the solid products from the liquid.

4. An apparatus for the production of coarse-crystalline ammonium sulphate from concentrated ammonia gas and sulphuric acid comprising a vessel adapted to receive the sulphuric acid to be worked up, means for introducing said ammonia gas in finely divided state into the liquid in said vessel, an agitating device provided in the liquid space of said vessel and consisting of a paddle wheel mounted for rotation about a vertical axis, a centrally recessed disc mounted on each side of the paddles of said wheel in such a manner that upon rotation of said wheel the liquid enters the spaces existing between said paddles from the center, a vertical shaft having fixed to it said wheel and mounted for rotation on said vessel, means for driving said shaft during the introduction of the gas, and means for withdrawing the solid products from the liquid.

5. An apparatus as specified in claim 4 with means for introducing the gas into the liquid in the vicinity of said central recesses of said paddle wheel, so that upon rotation of the latter the gas is sucked together with the liquid into the spaces existing between the paddles of said wheel.

6. An apparatus for the production of coarse-crystalline ammonium sulphate from ammonia gas and sulphuric acid comprising a vessel adapted to receive the sulphuric acid to be worked up and fitted with means for introducing gas to the liquid and with means for agitating the liquid in the vessel for favoring the production of coarse-crystalline solid products, a liquid lifting device arranged beside said vessel and communicating with the latter, said lifting device consisting of a substantially vertical pipe and another pipe spacedly arranged in the latter and open on its lower end, means provided on this end for blowing steam or air into said inner pipe, the bottom of said first-named pipe being situated at a level lower than that of said vessel, said inner pipe carrying on its upper end means for withdrawing the liquid rising therein upon supplying steam or air, and means for withdrawing the solid products from the liquid rising in said inner pipe.

7. In an apparatus as specified in claim 6 a vessel mounted on the upper end of and having a sectional area larger than that of, said inner pipe, said vessel being in connection with means for withdrawing the solid products from the liquid.

8. An apparatus for the production of coarse-crystalline ammonium sulphate from ammonia gas and sulphuric acid, comprising a vessel adapted to receive the sulphuric acid and fitted with means for introducing the ammonia gas into the sulphuric acid and with means for agitating the liquid in the vessel for favoring the production of coarse-crystalline solid products, means for gaining from the liquid in said vessel a mass composed of coarse-crystalline solid products and comparatively little liquid, a container including an agitating device and intended for the reception of said mass, and a centrifuge attached to said container for separating the coarse-crystalline solid salt products from the liquid.

ADOLF SCHMALENBACH.